United States Patent
Chen et al.

(10) Patent No.: US 10,129,910 B2
(45) Date of Patent: Nov. 13, 2018

(54) PRACH TRANSMISSION POWER ADJUSTMENT

(71) Applicant: QUALCOMM Incorporated, San Diego, CA (US)

(72) Inventors: Wanshi Chen, San Diego, CA (US); Peter Gaal, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 14/861,749

(22) Filed: Sep. 22, 2015

(65) Prior Publication Data

US 2016/0100434 A1 Apr. 7, 2016

Related U.S. Application Data

(60) Provisional application No. 62/060,528, filed on Oct. 6, 2014, provisional application No. 62/075,786, filed on Nov. 5, 2014.

(51) Int. Cl.
*H04W 74/08* (2009.01)
*H04W 52/36* (2009.01)
(Continued)

(52) U.S. Cl.
CPC ..... *H04W 74/0866* (2013.01); *H04W 52/362* (2013.01); *H04W 52/50* (2013.01);
(Continued)

(58) Field of Classification Search
CPC ........... H04W 74/0866; H04W 52/362; H04W 52/50; H04W 52/146; H04W 52/228; H04W 52/325
See application file for complete search history.

(56) References Cited

U.S. PATENT DOCUMENTS

| | | | |
|---|---|---|---|
| 2008/0194259 A1* | 8/2008 | Vujcic | H04W 74/0866 455/435.1 |
| 2010/0290408 A1 | 11/2010 | Steudle et al. | |

(Continued)

FOREIGN PATENT DOCUMENTS

| | | |
|---|---|---|
| EP | 1198076 A1 | 4/2002 |
| WO | 2010008859 A1 | 1/2010 |
| WO | 2010107354 A1 | 9/2010 |

OTHER PUBLICATIONS

International Search Report and Written Opinion—PCT/US2015/051822—ISA/EPO—Feb. 19, 2016.

*Primary Examiner* — Noel R Beharry
*Assistant Examiner* — Kevin H Lee
(74) *Attorney, Agent, or Firm* — Nerrie M. Zohn

(57) ABSTRACT

In a first configuration, a UE may determine a PRACH power ramp-up $P_{ramp-up}$ for the PRACH with respect to a previously unsuccessful PRACH transmission (e.g., a previously unsuccessful PRACH transmission with a highest transmission power). In a second configuration, when the UE is in a power-limited scenario, the UE drops/refrains from transmitting the PRACH transmission if $P_{ramp-up} - P_{scal} < P_{drop}$, and transmits the PRACH otherwise, where $P_{scal}$ is the power scaling factor, $P_{ramp-up}$ is the configured ramp-up power value, and $P_{drop}$ is a threshold. In a third configuration, the UE determines whether to increment a Preamble_Transmission_Counter. In one sub-configuration, the UE increments the Preamble_Transmission_Counter when the PRACH transmission takes place, and does not increment the Preamble_Transmission_Counter otherwise. In another sub-configuration, the UE increments the Preamble_Transmission_Counter when the PRACH transmission takes place and $P_{ramp-up} - P_{scal} \geq P_{count}$, where $P_{count}$ is a threshold, and does not increment the Preamble_Transmission_Counter otherwise.

25 Claims, 14 Drawing Sheets

(51) Int. Cl.
*H04W 52/50* (2009.01)
*H04W 52/14* (2009.01)
*H04W 52/22* (2009.01)
*H04W 52/32* (2009.01)

(52) U.S. Cl.
CPC ........ *H04W 52/146* (2013.01); *H04W 52/228* (2013.01); *H04W 52/325* (2013.01)

(56) References Cited

U.S. PATENT DOCUMENTS

| | | |
|---|---|---|
| 2013/0058315 A1 | 3/2013 | Feuersaenger et al. |
| 2014/0349712 A1* | 11/2014 | Shukla .................... H04W 4/22 455/561 |
| 2016/0044606 A1* | 2/2016 | Yin .................... H04W 52/325 455/450 |
| 2016/0337988 A1* | 11/2016 | Nan ...................... H04W 74/08 |
| 2017/0013565 A1* | 1/2017 | Pelletier .............. H04W 52/146 |
| 2017/0164410 A1* | 6/2017 | Takeda .............. H04W 74/0833 |

\* cited by examiner

PRACH TRANSMISSION POWER ADJUSTMENT

CROSS-REFERENCE TO RELATED APPLICATION(S)

This application claims the benefit of U.S. Provisional Application Ser. No. 62/060,528, entitled "PRACH TRANSMISSION HANDLING IN LTE" and filed on Oct. 6, 2014, and the benefit of U.S. Provisional Application Ser. No. 62/075,786, entitled "PRACH TRANSMISSION HANDLING IN LTE" and filed on Nov. 5, 2014, both of which are expressly incorporated by reference herein in its entirety.

FIELD

The present disclosure relates generally to communication systems, and more particularly, to physical random access channel (PRACH) transmission handling in Long Term Evolution (LTE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is LTE. LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In a first configuration, a user equipment (UE) may determine a PRACH power ramp-up $P_{ramp-up}$ for the PRACH with respect to a previously unsuccessful PRACH transmission (e.g., a previously unsuccessful PRACH transmission with a highest transmission power). In a second configuration, when the UE is in a power limited scenario, the UE drops/refrains from transmitting the PRACH transmission if $P_{ramp-up} - P_{scal} < P_{drop}$, and transmits the PRACH otherwise, where $P_{scal}$ is the power scaling value, $P_{ramp-up}$ is the configured ramp-up power value, and $P_{drop}$ a threshold. In a third configuration, the UE determines whether to increment a Preamble_Transmission_Counter. In one configuration, the UE increments the Preamble_Transmission_Counter when the PRACH transmission takes place (i.e., the PRACH is not dropped), and refrains from incrementing the Preamble_Transmission_Counter when the PRACH transmission does not take place (i.e., the PRACH is dropped). In another configuration, the UE increments the Preamble_Transmission_Counter when the PRACH transmission takes place and $P_{ramp-up} - P_{scal} \geq P_{count}$, where $P_{count}$ is a threshold, and refrains from incrementing the Preamble_Transmission_Counter otherwise.

In an aspect of the disclosure, a method, a computer program product, and an apparatus are provided. The apparatus may be a UE. The UE determines to scale a transmission power for a PRACH transmission of a plurality of concurrent PRACH transmissions. In addition, the UE determines whether to send the PRACH transmission based on the scaled transmission power. Further, the UE sends the PRACH transmission at the scaled transmission power upon determining to send the PRACH transmission.

In an aspect of the disclosure, a method, a computer program product, and an apparatus are provided. The apparatus may be a UE. The UE determines a transmission power for a PRACH transmission based at least on a power ramping stepsize and a previously determined transmission power of a previously sent unsuccessful PRACH transmission. The UE sends the PRACH transmission at the determined transmission power.

In an aspect of the disclosure, a method, a computer program product, and an apparatus are provided. The apparatus may be a UE. The UE determines to scale power by a power scaling factor for a PRACH transmission of a plurality of concurrent PRACH transmissions. A transmission power for the PRACH transmission is based at least on a power ramping stepsize and the power scaling factor. The UE determines whether to send the PRACH transmission. The UE determines whether to increment a preamble transmission counter based at least on the determination of whether to send the PRACH transmission. In one configuration, the determination whether to increment the preamble transmission counter is further based on both the power ramping stepsize and the power scaling factor. In one configuration, the determination whether to increment the preamble transmission counter is further based on a difference between the power ramping stepsize and the power scaling factor. In one configuration, the determining whether to increment the preamble transmission counter includes determining to refrain from incrementing the preamble transmission counter when the difference between the power ramping stepsize and the power scaling factor is less than a threshold or the PRACH transmission is determined not to be sent. In one configuration, the determining whether to increment the preamble transmission counter includes determining to increment the preamble transmission counter when the difference between the power ramping stepsize and the power scaling factor is greater than or equal to a threshold and the PRACH transmission is determined to be sent.

DETAILED DESCRIPTION

Figure 1:
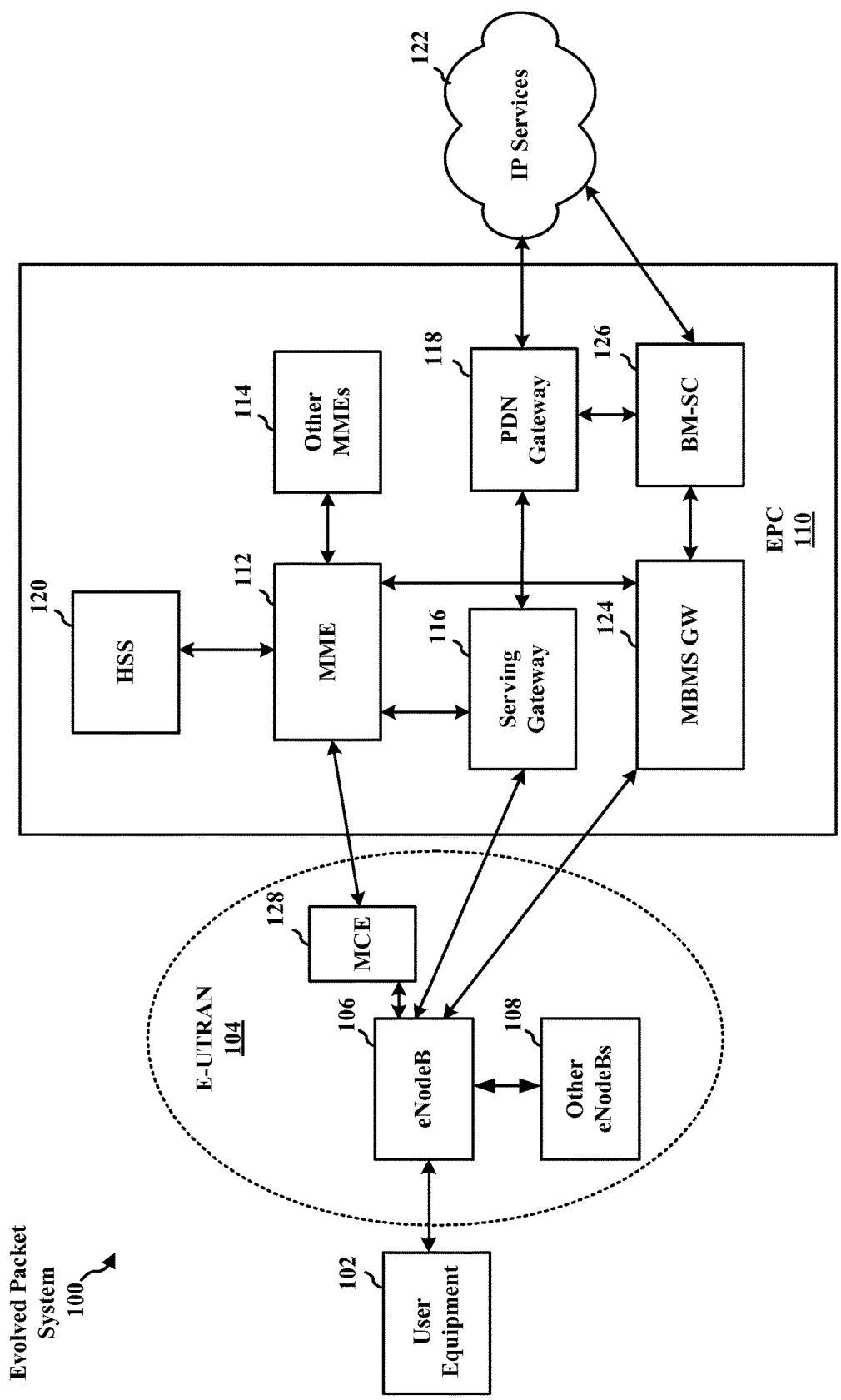
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
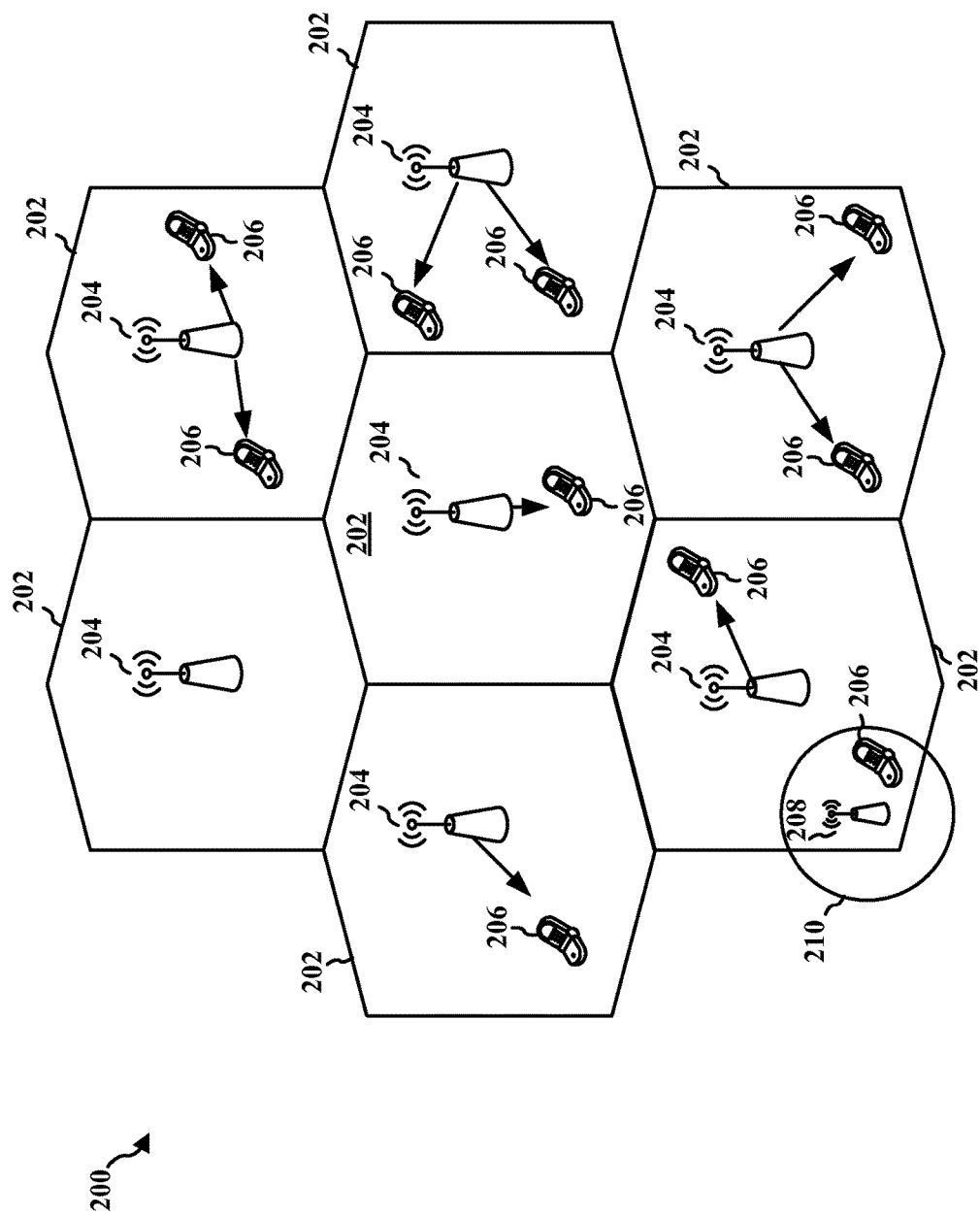
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
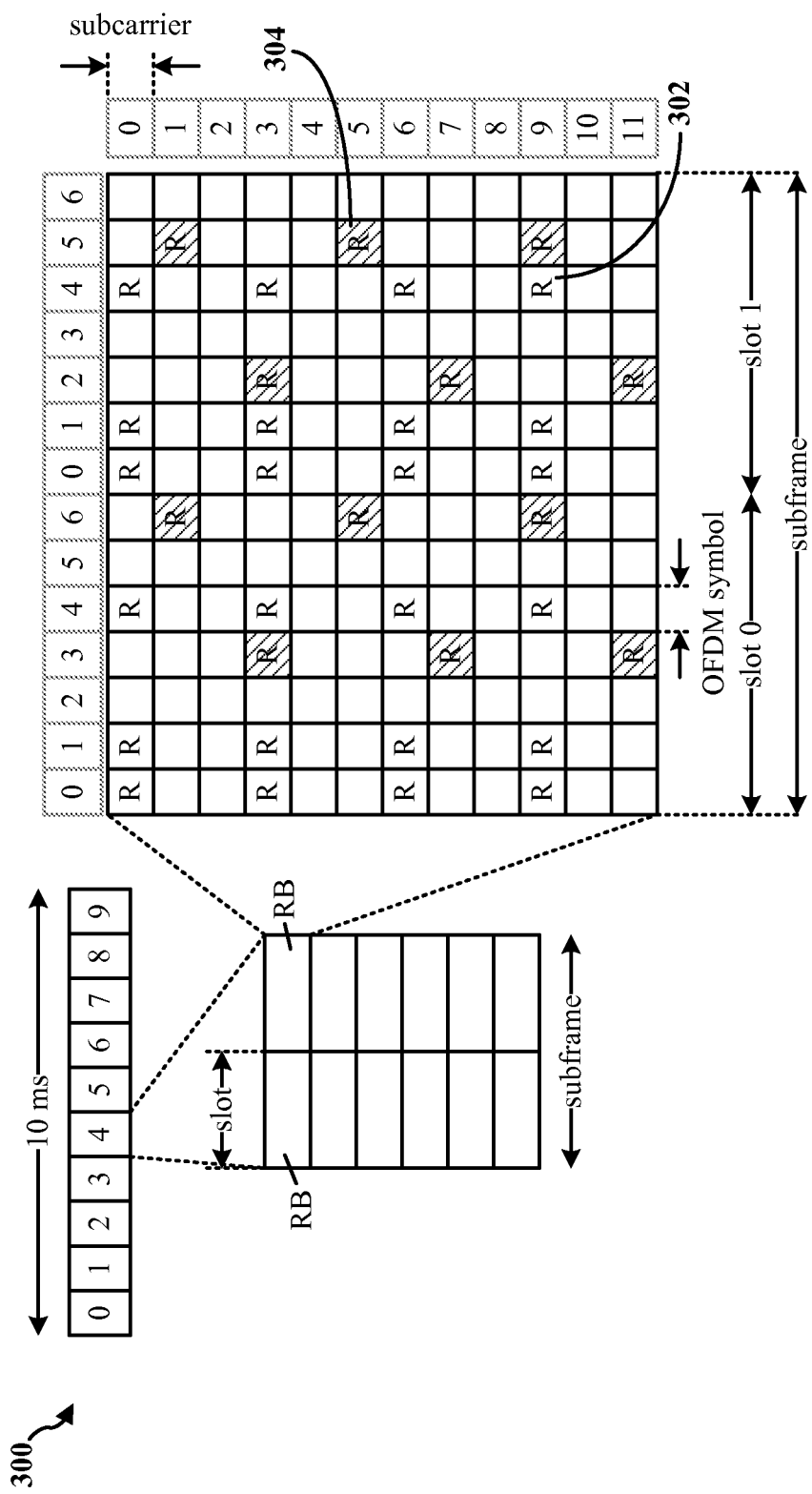
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include channel state information (CSI) RS (CSI-RS), Cell-specific RS (CRS) (also sometimes called common RS) 302, and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
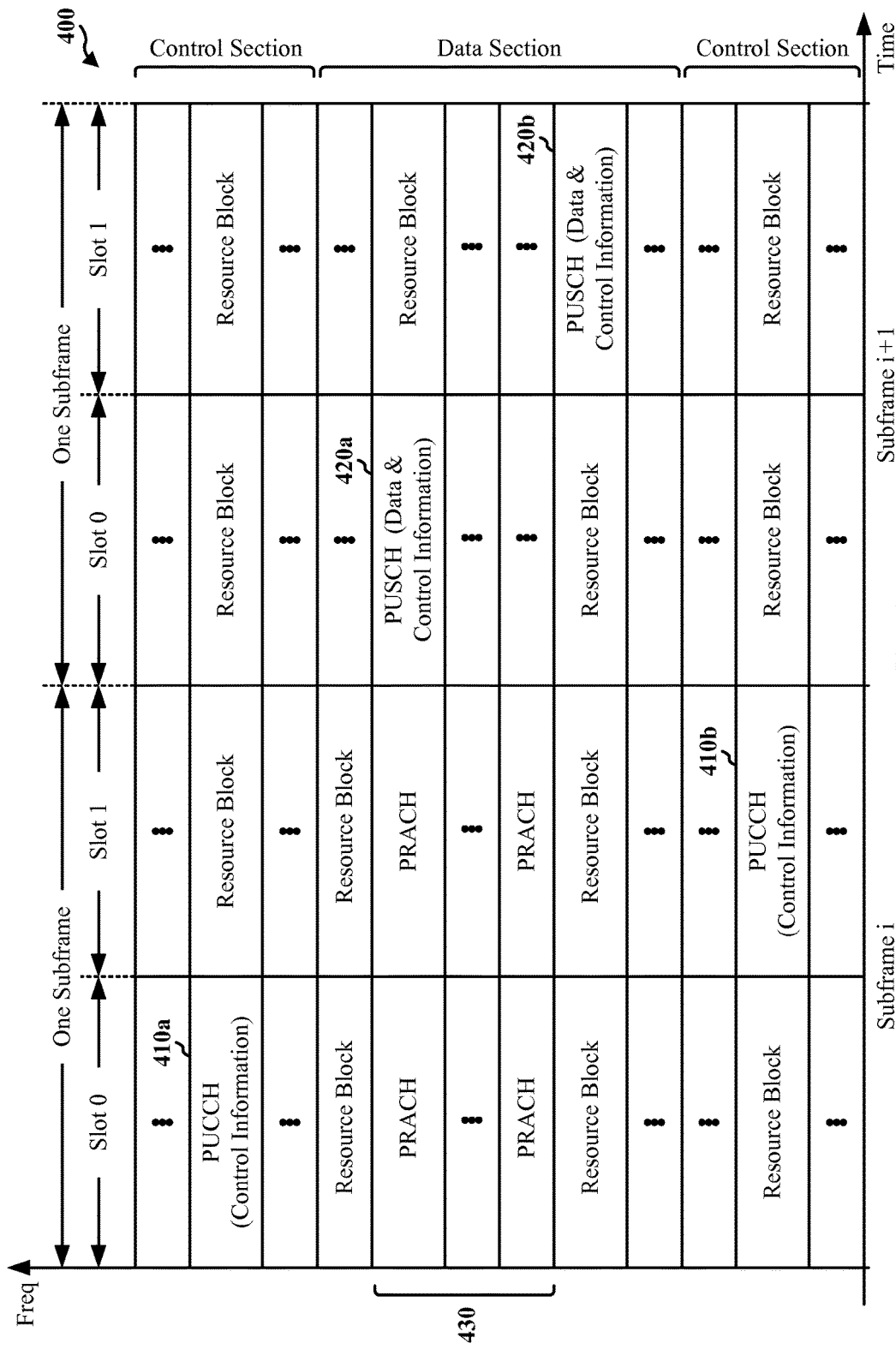
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
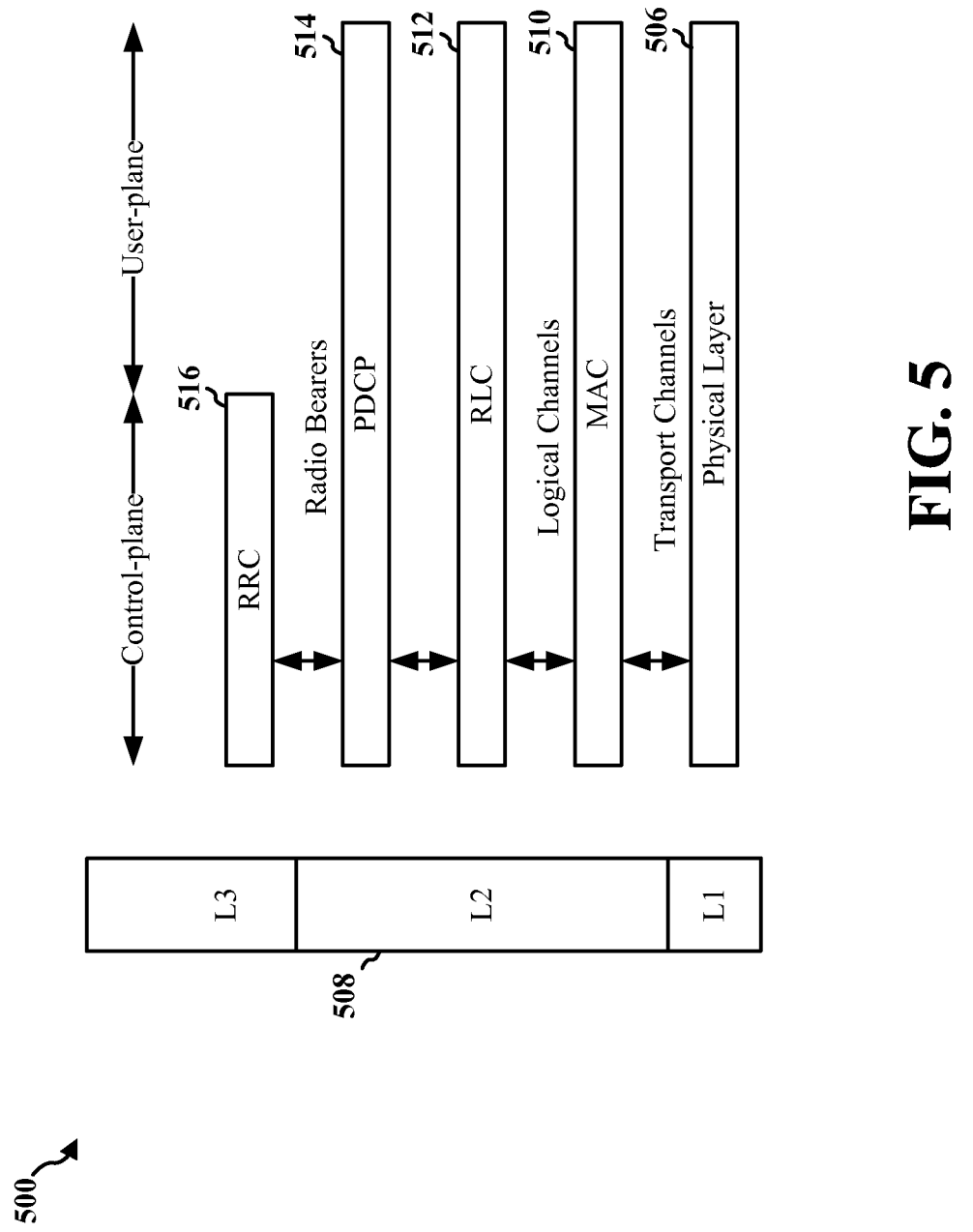
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
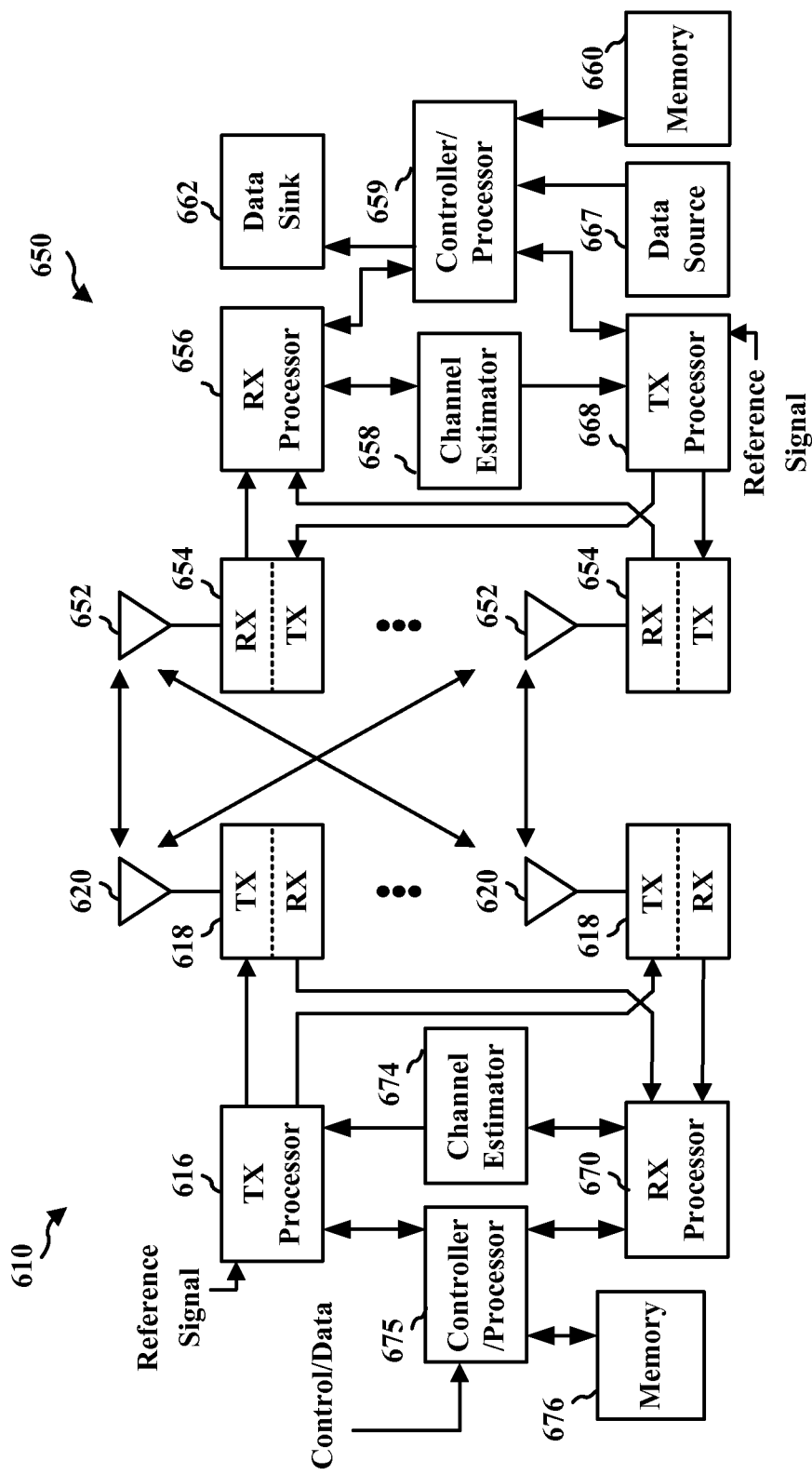
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7A:
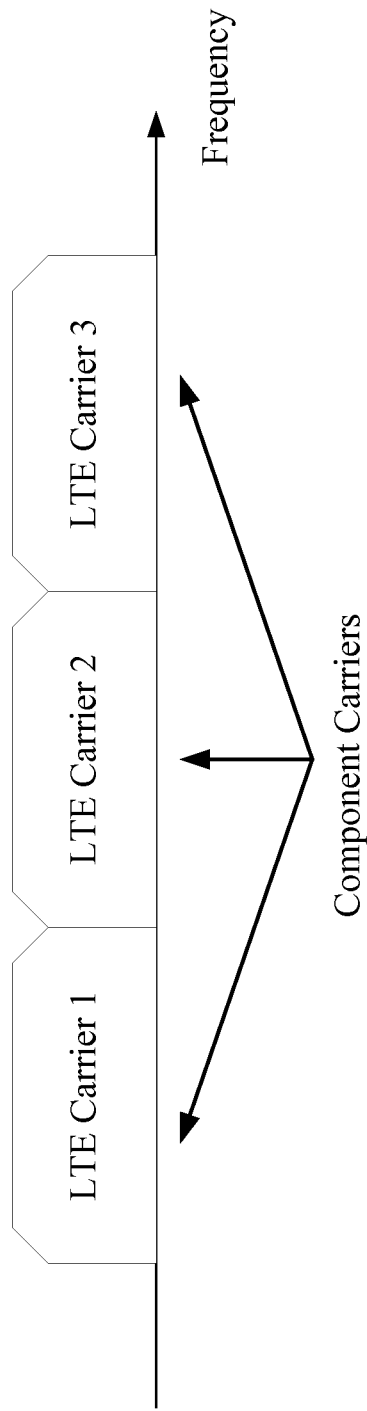
FIG. 7A is a diagram illustrating an example of continuous carrier aggregation.
Figure 7B:
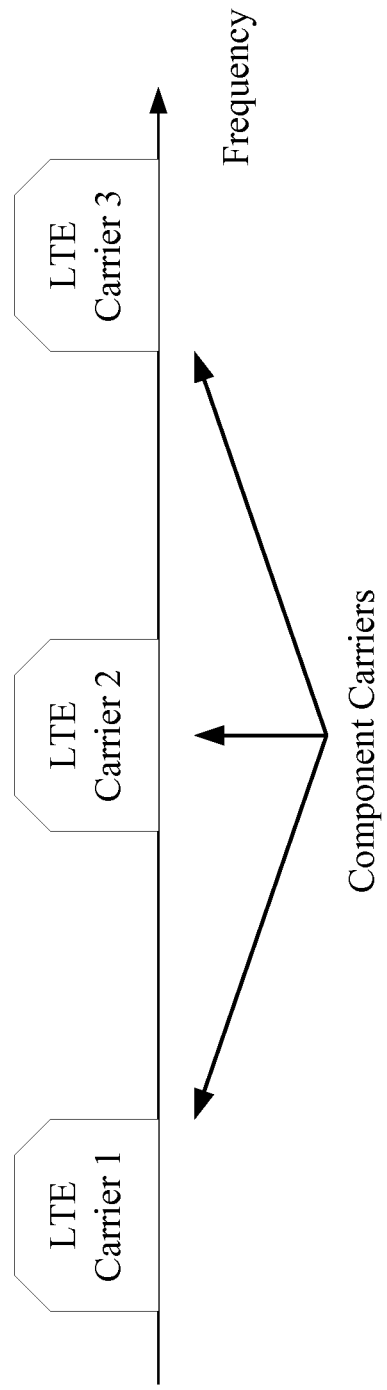
FIG. 7B is a diagram illustrating an example of non-continuous carrier aggregation.

FIG. 7A discloses a continuous carrier aggregation type. FIG. 7B discloses a non-continuous carrier aggregation type. UEs may use spectrum up to 20 MHz bandwidths per carrier, which can be allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments conserve spectrum and are a good fit for the typically asymmetric bandwidth utilization by broadband subscribers. Two types of carrier aggregation (CA) methods have been proposed, continuous CA and non-continuous CA. The two types of CA methods are illustrated in FIGS. 7A and 7B. Non-continuous CA occurs when multiple available component carriers are separated along the frequency band (FIG. 7B). On the other hand, continuous CA occurs when multiple available component carriers are adjacent to each other (FIG. 7A). Both non-continuous and continuous CA aggregates multiple LTE/component carriers to serve a single UE. The component carriers may include a primary component carrier and one or more secondary component carriers. A primary component carrier may be referred to as a primary cell (Pcell) and a secondary component carrier may be referred to as a secondary cell (SCell).

Figure 8:
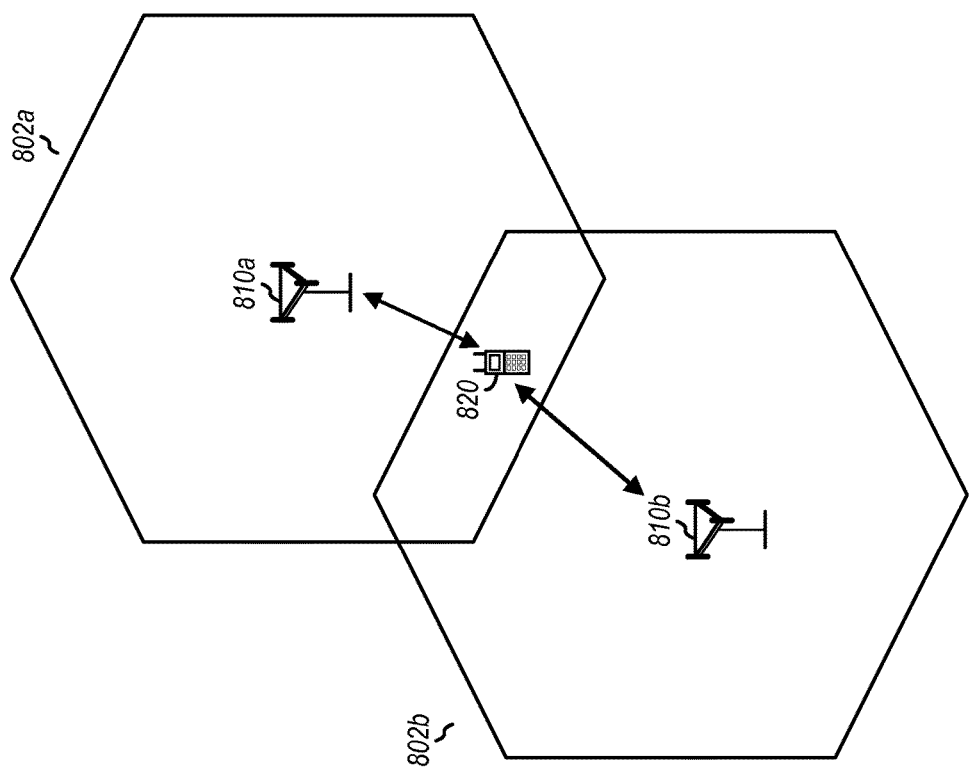
FIG. 8 is a diagram illustrating dual connectivity.

FIG. 8 is a diagram 800 illustrating dual connectivity. UEs on a cell edge may experience high inter-cell interference, which may limit data rates. As illustrated in FIG. 8, the UE 820 has dual connectivity (DC) with the eNB 810a and the eNB 810b. The UE 820 may have DC with the eNBs 810a, 810b when the UE 820 is within the range of both of the eNBs 810a, 810b (in the cells 802a, 802b). A UE 820 with DC may send data to and receive data from the eNBs 810a, 810b simultaneously in independent data streams. The independent data streams improve cell edge user experience and increase throughput data speeds for the UE 820.

A UE may be scheduled for an uplink transmission if the uplink transmission timing of the UE is synchronized. The PRACH is used to achieve uplink time synchronization for a UE that has lost or not yet acquired uplink time synchronization. The PRACH is also used for initial network access. A UE may determine a transmission power for transmitting the PRACH based on the following equation:

$$P_{PRACH} = \min\{P_{CMAXc}(i), \text{PREAMBLE\_RECEIVED\_TARGET\_POWER} + PL_c\},$$

where $P_{CMAXc}(i)$ is the configured UE transmit power for subframe i of serving cell c, $PL_c$ is the estimated path loss for serving cell c, and PREAMBLE_RECEIVED_TARGET_POWER is given by:

PREAMBLE_RECEIVED_TARGET_POWER=preambleInitialReceivedTargetPower+Delta_Preamble+(Preamble_Transmission_Counter−1)*powerRampingStep in which the preambleInitialReceivedTargetPower is configured for a UE, Delta_Premable depends on the PRACH preamble format, Preamble_Transmission_Counter is the number of PRACH attempts, and powerRampingStep is configured for a UE and can be 0/2/4/6 dB.

In CA, if a UE is UL power limited, PRACH may be given higher priority, but if there are two or more PRACHs in a subframe, power prioritization between the two or more PRACHs may be left to UE implementation. In DC, if the UE is UL power limited, the primary cell PRACH may be given the highest priority. Power prioritization between all other PRACHs (including the primary/secondary cell PRACH in the secondary group) may be unspecified, although these PRACHs may still be given a higher priority than other UL channels (e.g., PUCCH, PUSCH, SRS, etc.). However, because the primary cell PRACH is given the highest priority, other PRACHs are subject to power scaling, and the original intended power ramp-up for PRACH is impacted. The impact depends on the amount of power scaling.

To mitigate the impact of power scaling on PRACH power ramp-up, once the UE performs power scaling for PRACH, the PRACH may not be counted as part of the Preamble_Transmission_Counter such that PRACH transmit power ramp-up is suspended for the transmission and the transmission is not counted as the overall max number of PRACH transmission attempts. That is, to mitigate the impact of power scaling on PRACH power ramp-up, the Preamble_Transmission_Counter may be suspended when the UE performs power scaling for PRACH. Suspending the Preamble_Transmission_Counter may cause issues. Power scaling for PRACH can be large or small. To suspend Preamble_Transmission_Counter update blindly is problematic. For example, if the scaling is large (e.g., PRACH is scaled down by 10 dB but the power ramp-up stepsize is 2 dB), there will be huge power ramp-up comparing the current PRACH transmission and the next PRACH transmission (e.g., if power scaling is 10 dB down, and power ramp-up is 2 dB, there may be 12 dB power difference between current and the next PRACH transmissions (contrary to the intended 2 dB power ramp-up)). In such an example, suspending the counter is beneficial. However, if the scaling is small (e.g., PRACH is scaled down by 0.5 dB but the power ramp-up stepsize is 4 dB), suspending the counter may not be beneficial.

As discussed supra, in the case of parallel PRACH transmissions other than the PCell PRACH, the PRACH handling may be left to UE implementation. Because the lower priority PRACHs are subject to power scaling/dropping, the current intended power ramp-up for PRACH is impacted. To mitigate the impact of power scaling/dropping on PRACH power ramp-up, once a UE performs power scaling for the PRACH, the PRACH may be dropped and not counted by the Preamble_Transmission_Counter toward the maximum number of allowed PRACH attempts. However, the power scaling for PRACH can vary, and be large or small. Blindly dropping and omitting the Preamble_Transmission_Counter update may not be desirable. Even more importantly, power ramp-up based on the unscaled power level after an unsuccessful PRACH transmission that was power scaled may lead to a significant increase in the PRACH transmission power in cases when power scaling is not needed (UE is not power limited anymore).

In exemplary configurations, the power ramp-up reference value and a decision on whether the PRACH transmission is dropped or transmitted with the scaled power may be based on the power scaling value and the configured ramp-up value. For example, if the scaled power available for consecutive PRACH transmissions is smaller than the power ramp-up (i.e., less than the previous unsuccessful PRACH transmission), the new PRACH transmission may be dropped. In other cases where the scaling is insignificant with respect to the intended ramp-up, the PRACH transmission may not be dropped. The power ramp-up may be determined with respect to the power of the previous actual PRACH transmission that had highest transmission power among the unsuccessful PRACH attempts in an ongoing PRACH procedure. By basing the subsequent PRACH transmission power ramp-up on the previous maximum actual transmission power in case of power scaling/dropping, the increment in the PRACH power may be more gradual and in line with the behavior intended by the original power ramp-up procedure. Otherwise, large variations in the PRACH transmission power could occur, which may not be desirable for UL operation. The decision of whether to count the PRACH toward the maximum number of allowed transmissions can also be based on the difference between the ramp-up value and the power scaling value. In a simple case, that could mean that if the PRACH transmission is dropped, the Preamble_Transmission_Counter is not incremented, and is incremented otherwise (when PRACH scaled transmission takes place).

Figure 9A:
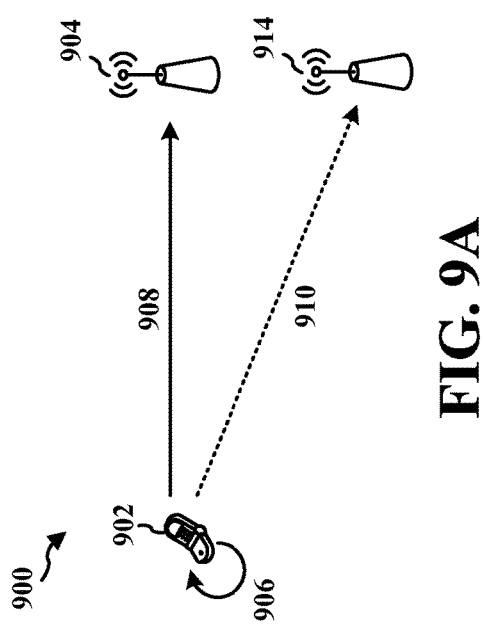
FIGS. 9A, 9B, 9C, and 9D are diagrams for illustrating exemplary methods/apparatuses for PRACH transmission handling.

FIG. 9A is a diagram 900 for illustrating exemplary methods/apparatuses for PRACH transmission handling. As shown in FIG. 9A, the UE 902 with DC determines 906 that PRACHs 908, 910 are to be transmitted concurrently in the same subframe to the eNBs 904, 914.

In a first configuration, the UE 902 determines a PRACH power ramp-up for the PRACH 910 with respect to the highest power level of previously unsuccessful PRACH transmissions.

In a second configuration, when the UE 902 is in a power limited scenario, the UE 902 drops/refrains from transmitting the PRACH transmission 910 if the power ramp-up ($P_{ramp-up}$) minus a power scaling factor ($P_{scal}$) is less than a threshold $P_{drop}$ (i.e., $P_{ramp-up}-P_{scal}<P_{drop}$), and transmits the PRACH 910 otherwise (i.e., $P_{ramp-up}-P_{scal} \geq P_{drop}$), where $P_{scal}$ is the power scaling factor, $P_{ramp-up}$ is the configured ramp-up power value (i.e., powerRampingStep), and $P_{drop}$ is a threshold. In one sub-configuration, configuration, the threshold $P_{drop}$ may be greater than or equal to zero. In another sub-configuration, the threshold $P_{drop}$ may be equal to zero.

In a third configuration, the UE 902 determines 906 whether to increment the Preamble_Transmission_Counter. In one sub-configuration, the UE 902 increments the Preamble_Transmission_Counter when the PRACH transmission 910 takes place (i.e., the PRACH is not dropped), and refrains from incrementing the Preamble_Transmission_Counter when the PRACH transmission 910 does not take place (i.e., the PRACH is dropped). In another sub-configuration, the UE 902 increments the Preamble_Transmission_Counter when the PRACH transmission 910 takes place and the power ramp-up ($P_{ramp-up}$) minus a power scaling factor ($P_{scal}$) is greater than or equal to a threshold $P_{count}$ (i.e., $P_{ramp-up}-P_{scal} \geq P_{count}$), where $P_{count}$ is a threshold. In such sub-configuration, the UE 902 refrains from incrementing the Preamble_Transmission_Counter when the PRACH transmission 910 does not take place or the power ramp-up ($P_{ramp-up}$) minus a power scaling factor ($P_{scal}$) is less than the threshold $P_{count}$ (i.e., $P_{ramp-up}-P_{scal}<P_{count}$). In such a configuration, $P_{count}$ equals $P_{drop}$, the Preamble_Transmission_Counter is incremented only when the PRACH transmission 910 takes place, and is not incremented when the PRACH transmission 910 is dropped.

Figure 9B:
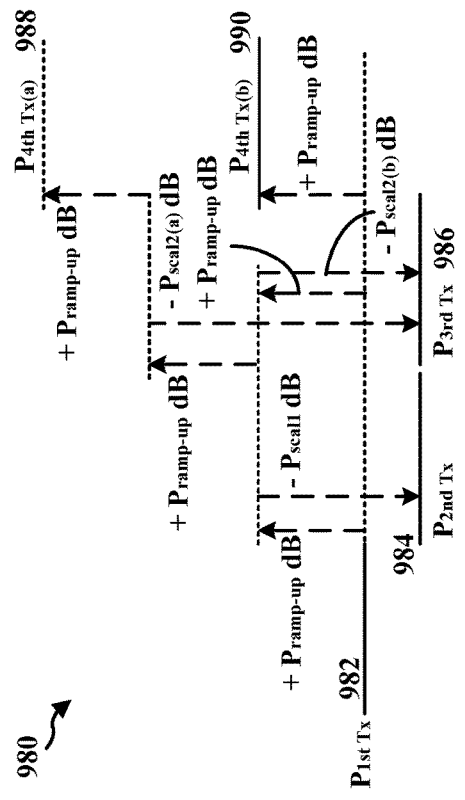
Figure 9C:
Figure 9D:
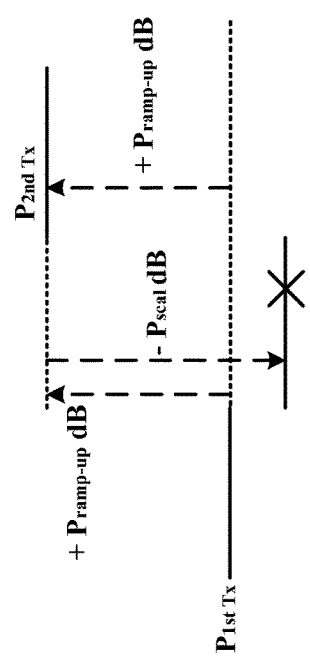

FIGS. 9B, 9C, 9D are diagram 930, 960, 990 for illustrating exemplary methods/apparatuses for PRACH transmission handling.

FIG. 9B depicts a scenario 930 where power ramp-up is $P_{ramp-up}$ and the power scaling due to the power limitation is $P_{scal}$, where power ramp-up $P_{ramp-up}$ minus the power scaling factor $P_{scal}$ is assumed to be greater than or equal to the threshold $P_{drop}$ (i.e., $P_{ramp-up} - P_{scal} \geq P_{drop}$). In this case, a UE transmits the power scaled second PRACH ($P_{2ndTx}$) (the power for $P_{2ndTx}$ is determined based on the power of the first successful PRACH transmission $P_{1stTx}$ plus the power ramp-up $P_{ramp-up}$ minus the power scaling factor $P_{scal}$) and if $P_{ramp-up} - P_{scal} \geq P_{count}$, the Preamble_Transmission_Counter is incremented. If the second PRACH transmission is unsuccessful ($P_{2ndTx}$), the next PRACH transmission ($P_{3rdTx}$) (assumed not scaled here) is performed with the power ramp-up of $P_{ramp-up}$ with respect to the previous (scaled) PRACH transmission ($P_{2ndTx}$).

FIG. 9C is an example 960 where the power scaling factor $P_{scal}$ is larger than the power ramp-up $P_{ramp-up}$ for a second PRACH transmission attempt (shown by the X), so the resulting available power would be less than the power for the previous unsuccessful PRACH transmission ($P_{1stTx}$). In FIG. 9C, the power $P_{ramp-up}$ minus the power scaling factor $P_{scal}$ is assumed to be less than the threshold $P_{drop}$ (i.e., $P_{ramp-up} - P_{scal} < P_{drop}$). In such case, the PRACH is dropped, as it may be unreasonable to transmit at the power level lower than the PRACH which was already unsuccessful. In addition, as the PRACH is dropped, the Preamble_Transmission_Counter is not incremented. The second actual PRACH transmission ($P_{2ndTx}$) is performed at the next PRACH opportunity with the power ramp-up of $P_{ramp-up}$ (assuming no power scaling is necessary) with respect to the previous unsuccessful PRACH transmission ($P_{1stTx}$) with a highest power level (which is the first transmission in this example). Even if in the second PRACH opportunity (at the X) the PRACH transmission was not dropped and the UE decided to transmit the PRACH at the power level less than the previous (first) attempt (at $P_{1stTx}$), and the attempt was unsuccessful, in the third transmission opportunity (at $P_{2ndTx}$) the power ramp-up $P_{ramp-up}$ would be based on the highest previous transmission level, which would be the transmission power of the first attempt (at $P_{1stTx}$) in this example (and not at the second attempt at the X). Applying the conventional ramp-up formula to the third PRACH attempt (at $P_{2ndTx}$) would result in the power level of $2*P_{ramp-up}$ greater the first attempt (at $P_{1stTx}$), which may be unnecessarily too high of a power level to have a successful PRACH transmission.

FIG. 9D is an example 980 that presents both PRACH attempt results following conventional PRACH power handling rules ($P_{4thTx(a)}$ 988) and PRACH attempt results following exemplary PRACH behavior ($P_{4thTx(b)}$ 990). Following conventional PRACH handling rules results in a power spike in the PRACH transmission $P_{4thTx(a)}$ 988, which may be much higher after several unsuccessful PRACH attempts at 982, 984, 986 ($P_{1stTx}$ to $P_{3rdTx}$) that involved power scaling. In the conventional PRACH handling rules, the Preamble_Transmission_Counter is incremented after the unsuccessful first PRACH transmission $P_{1stTx}$ 982; the transmission power of the second PRACH transmission $P_{2ndTx}$ 984 is determined based on the transmission power of the first PRACH transmission $P_{1stTx}$ 982 plus the power ramp-up $P_{ramp-up}$ minus the power scaling factor $P_{scal1}$; the Preamble_Transmission_Counter is again incremented after the unsuccessful second PRACH transmission $P_{2ndTx}$ 984; the transmission power of the third PRACH transmission $P_{3rdTx}$ 986 is determined based on the transmission power of the first PRACH transmission $P_{1stTx}$ 982 plus two times (see equation supra for determining PREAMBLE_RECEIVED_TARGET_POWER) the power ramp-up $P_{ramp-up}$ minus the power scaling factor $P_{scal2(a)}$; the Preamble_Transmission_Counter is again incremented after the unsuccessful third PRACH transmission $P_{3rdTx}$ 986; and the transmission power of the fourth PRACH transmission $P_{4thTx(a)}$ 988 is determined based on the transmission power of the first PRACH transmission $P_{1stTx}$ 982 plus three times (see equation supra for determining PREAMBLE_RECEIVED_TARGET_POWER) the power ramp-up $P_{ramp-up}$ (it is assumed there is no power scaling here). As depicted in FIG. 9D, the fourth attempt $P_{4thTx(a)}$ 988 would be at an unnecessarily high power level ($P_{4thTx(a)}$, which is $3*P_{ramp-up}$ higher than the previous transmission attempt $P_{1stTx}$) if based on the power rump-up $P_{ramp-up}$ without taking into account the power scaling/dropping of the previous unsuccessful attempts. Accordingly, the conventional PRACH handling rules result in an unnecessarily high PRACH transmission power at the fourth PRACH transmission $P_{4thTx(a)}$ 988. The transmission power of the fourth PRACH transmission $P_{4thTx(a)}$ 988 is unnecessarily high because a lower PRACH transmission power may be successful.

In contrast, following an exemplary PRACH behavior results in a reasonable power level increase where the power ramp-up is based on the highest transmission power of the previous unsuccessful attempts (or the immediately prior unsuccessful transmission) ($P_{4thTx(b)}$, which is $P_{ramp-up}$ higher than the previous highest power transmission $P_{1stTx}$). In one configuration of the exemplary PRACH handling rules, the Preamble_Transmission_Counter is incremented after the unsuccessful first PRACH transmission $P_{1stTx}$ 982; the transmission power of the second PRACH transmission $P_{2ndTx}$ 984 is determined based on the transmission power of the first PRACH transmission $P_{1stTx}$ 982 plus the power ramp-up $P_{ramp-up}$ minus the power scaling factor $P_{scal1}$; assuming $P_{ramp-up} - P_{scal1} < P_{drop}$, the second PRACH transmission $P_{2ndTx}$ 984 is dropped and the Preamble_Transmission_Counter is not incremented; the transmission power of the third PRACH transmission $P_{3rdTx}$ 986 is determined based on the transmission power of the first PRACH transmission $P_{1stTx}$ 982 plus the power ramp-up $P_{ramp-up}$ minus the power scaling factor $P_{scal2(b)}$; assuming $P_{ramp-up} - P_{scal2(b)} < P_{drop}$, the third PRACH transmission $P_{3rdTx}$ 986 is dropped and the Preamble_Transmission_Counter is not incremented; and the transmission power of the fourth PRACH transmission $P_{4thTx(b)}$ 990 is determined based on the transmission power of the first PRACH transmission $P_{1stTx}$ 982 plus the power ramp-up $P_{ramp-up}$ (it is assumed there is no power scaling here).

In another configuration of the exemplary PRACH handling rules, even if conventional PRACH handling rules are followed for the first, second, and third PRACH transmissions ($P_{1stTx}$ to $P_{3rdTx}$) 982, 984, 986, the transmission power for the fourth PRACH transmission $P_{4thTx(b)}$ 990 is determined based on the transmission power of the first PRACH transmission $P_{1stTx}$ 982 plus the power ramp-up $P_{ramp-up}$, irrespective of the incremented Preamble_Transmission_Counter.

Figure 10:
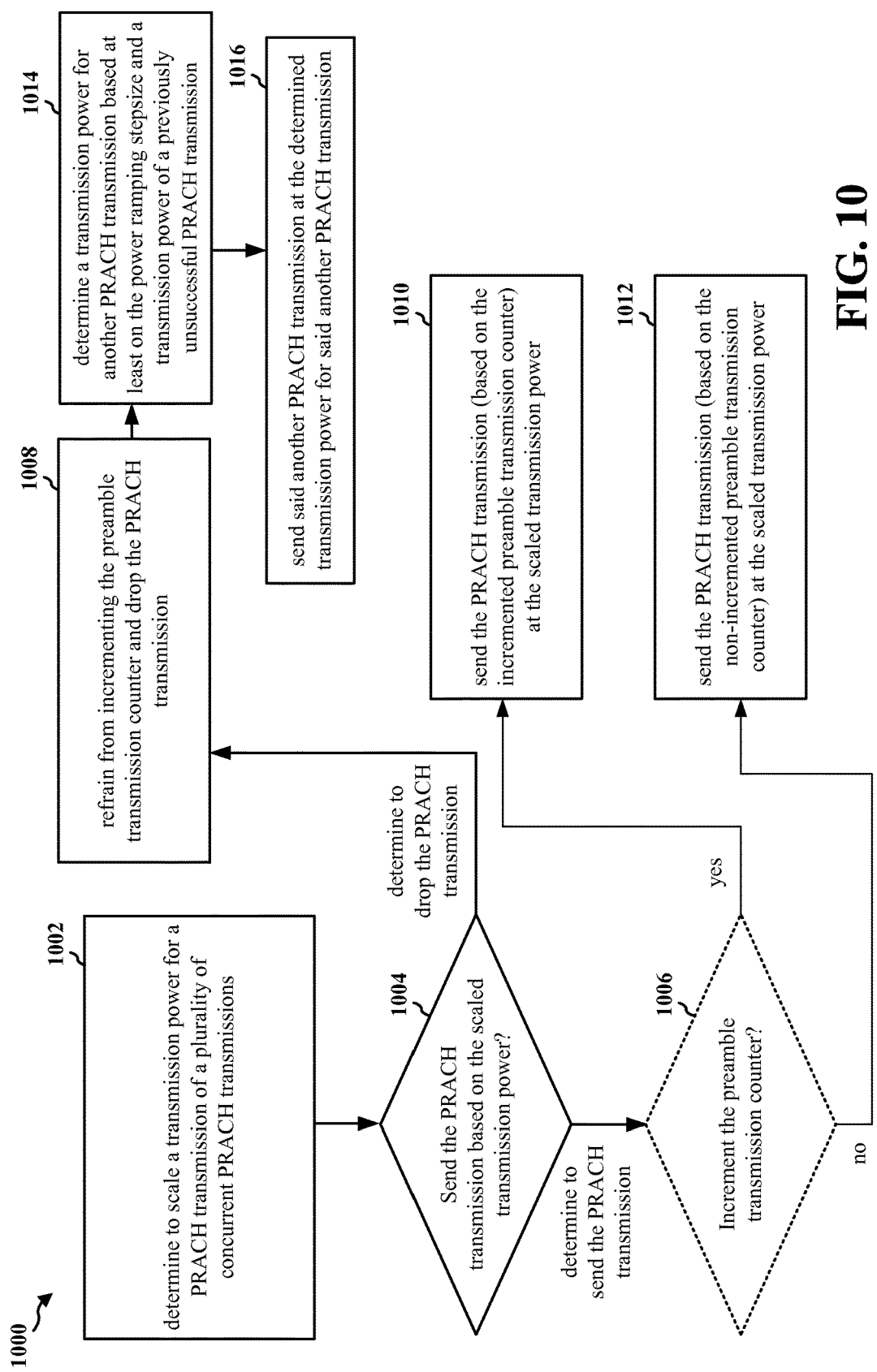
FIG. 10 is a flow chart of a first method of wireless communication.

FIG. 10 is a flow chart 1000 of a method of wireless communication. The method may be performed by a UE, such as the UE 902. If two PRACHs collide or a PRACH overlaps with other channels, the PCell PRACH has higher priority than (e.g., is allocated before) other PRACHs of other CCs, and other PRACHs have higher priority than (e.g., is allocated before) other channels (e.g., PUSCH, PUCCH, etc.). Priority among other PRACHs may be up to UE implementation. Whether a lower prioritized PRACH is power scaled or dropped may also be up to UE implementation. If PRACH is dropped, the UE may refrain from incrementing the preamble transmission counter. If the PRACH is power scaled, the UE may determine whether or not to increment the preamble transmission counter. Further details are described with respect to FIG. 10.

At 1002, a UE determines to scale a transmission power for a PRACH transmission of a plurality of concurrent (e.g., completely or partially overlapping in time) PRACH transmissions. For example, referring to FIG. 9A, a UE with DC may determine to scale a transmission power for a PRACH transmission 910 of a plurality of concurrent PRACH transmissions 908, 910.

At 1004, the UE determines whether to send the PRACH transmission based on the scaled transmission power. In one configuration, the UE may determine to scale the transmission power for the PRACH transmission based on a power scaling factor $P_{scal}$. The transmission power for the PRACH transmission may be based on a power ramping stepsize $P_{ramp-up}$ and the power scaling factor $P_{scal}$. In such a configuration, at 1004, the UE may determine whether to send the PRACH transmission based on the power ramping stepsize $P_{ramp-up}$ and the power scaling factor $P_{scal}$. In one configuration, the UE may determine whether to send the PRACH transmission based on a difference between the power ramping stepsize $P_{ramp-up}$ and the power scaling factor $P_{scal}$. In one configuration, the UE may determine whether to send the PRACH transmission based on whether the difference between the power ramping stepsize $P_{ramp-up}$ and the power scaling factor $P_{scal}$ is greater than or equal to a threshold $P_{drop}$. For example, the UE may determine to send the PRACH transmission when the difference between the power ramping stepsize $P_{ramp-op}$ and the power scaling factor $P_{scal}$ is greater than or equal to the threshold $P_{drop}$. Conversely, the UE may refrain from sending the PRACH transmission when the difference between the power ramping stepsize $P_{ramp-up}$ and the power scaling factor $P_{scal}$ is less than the threshold $P_{drop}$. Referring to the example in FIG. 9B, upon determining to scale the PRACH transmission power, the UE determines to send the PRACH transmission because $P_{ramp-up} - P_{scal} \geq P_{drop}$. Referring to the example in FIG. 9C, upon determining to scale the PRACH transmission power, the UE determines not to send the PRACH transmission because $P_{ramp-up} - P_{scal} < P_{drop}$.

Upon determining to send the PRACH transmission at 1004, at 1006, the UE may determine whether to increment a preamble transmission counter based at least on the determination of whether to send the PRACH transmission.

If the UE determines to increment the preamble transmission counter, at 1010, the UE sends the PRACH transmission (based on the incremented preamble transmission counter) at the scaled transmission power.

If the UE determines not to increment the preamble transmission counter, at 1012, the UE sends the PRACH transmission (based on the non-incremented preamble transmission counter) at the scaled transmission power.

Upon determining not to send the PRACH transmission at 1004, at 1008, the UE refrains from incrementing the preamble transmission counter and drops the PRACH transmission.

At 1006, the UE may determine whether to increment a preamble transmission counter based on the power ramping stepsize $P_{ramp-up}$ and the power scaling factor $P_{scal}$. In one configuration, the determination whether to increment the preamble transmission counter is based on a difference between the power ramping stepsize $P_{ramp-up}$ and the power scaling factor $P_{scal}$. In one configuration, when determining whether to increment the preamble transmission counter at 1006, the UE determines to increment the preamble transmission counter when the PRACH transmission is determined to be sent and the difference between the power ramping stepsize $P_{ramp-up}$ and the power scaling factor $P_{scal}$ is greater than or equal to a threshold $P_{count}$ ($P_{ramp-up} - P_{scal} \geq P_{count}$). In one configuration, when determining whether to increment the preamble transmission counter, the UE determines to refrain from incrementing the preamble transmission counter upon determining not to send the PRACH transmission or when the difference between the power ramping stepsize $P_{ramp-up}$ and the power scaling factor $P_{scal}$ is less than a threshold $P_{count}$ ($P_{ramp-up} - P_{scal} < P_{count}$).

Subsequently, after 1008 a 1014, the UE may determine a transmission power for another PRACH transmission based at least on the power ramping stepsize $P_{ramp-up}$ and a transmission power of a previously unsuccessful PRACH transmission. In addition, at 1016, the UE may send the another PRACH transmission at the determined transmission power for the another PRACH transmission. In one configuration, at 1016, the transmission power of the previously unsuccessful PRACH transmission is a highest transmission power of previously sent unsuccessful PRACH transmissions. In one configuration, at 1016, the transmission power of the previously unsuccessful PRACH transmission is a transmission power of an immediately previous sent unsuccessful PRACH transmission. For examples, see FIGS. 9B, 9C, and 9D.

Figure 11:
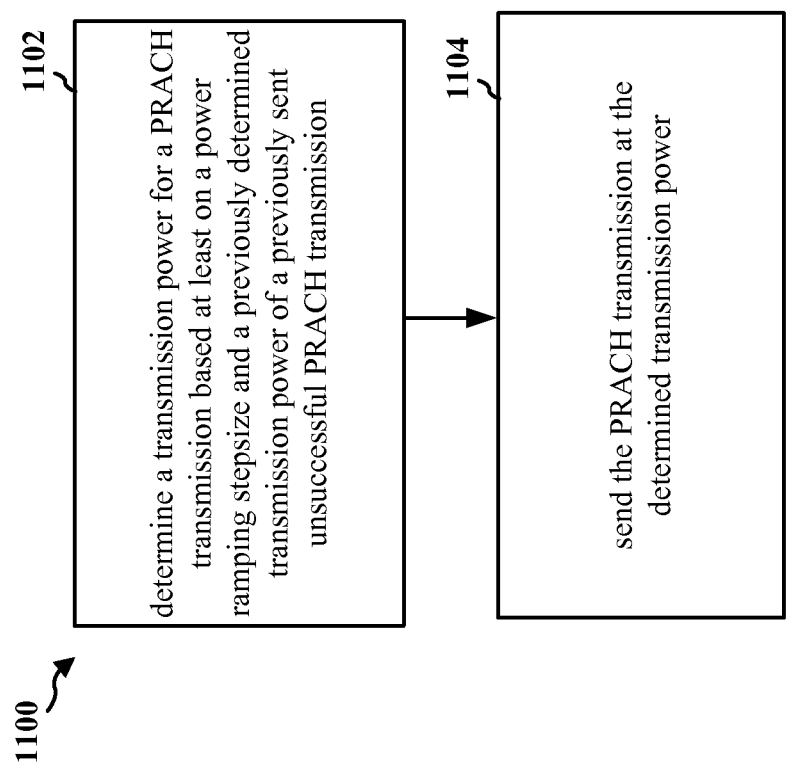
FIG. 11 is a flow chart of a second method of wireless communication.

FIG. 11 is a flow chart 1100 of a method of wireless communication. The method may be performed by a UE, such as the UE 902.

At 1102, the UE determines a transmission power for a PRACH transmission based at least on a power ramping stepsize $P_{ramp-up}$ and a previously determined transmission power of a previously sent unsuccessful PRACH transmission. Block 1102 may correspond to 1014 of FIG. 10.

At 1104, the UE sends the PRACH transmission at the determined transmission power. Block 1104 may correspond to 1016 of FIG. 10. In one configuration, the transmission power of the previously sent unsuccessful PRACH transmission is a highest transmission power of previously sent unsuccessful PRACH transmissions. In another configuration, the transmission power of the previously sent unsuccessful PRACH transmission is a transmission power of an immediately previous sent unsuccessful PRACH transmission. The UE may perform one or more additional blocks as indicated in FIG. 10.

Figure 12:
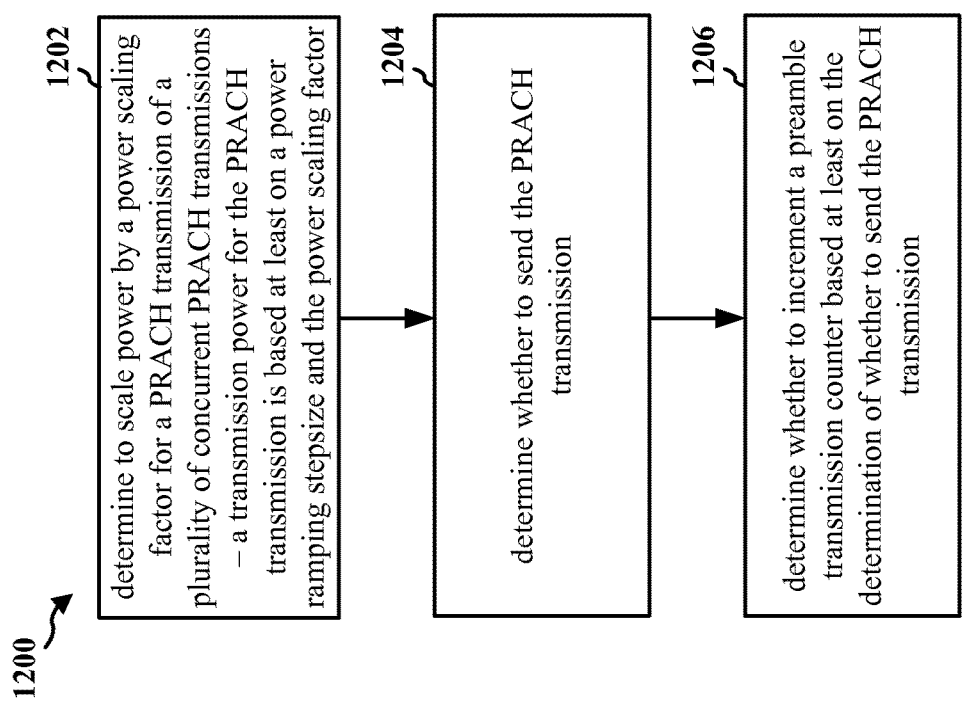
FIG. 12 is a flow chart of a third method of wireless communication.

FIG. 12 is a flow chart 1200 of a method of wireless communication. The method may be performed by a UE, such as the UE 902.

At 1202, a UE determines to scale power by a power scaling factor $P_{scal}$ for a PRACH transmission of a plurality of concurrent PRACH transmissions. A transmission power for the PRACH transmission is based at least on a power ramping stepsize $P_{ramp-up}$ and the power scaling factor $P_{scal}$.

At 1204, the UE determines whether to send the PRACH transmission.

At 1206, the UE determines whether to increment a preamble transmission counter based at least on the determination of whether to send the PRACH transmission.

In one configuration, the determination whether to increment the preamble transmission counter is further based on both the power ramping stepsize $P_{ramp-up}$ and the power scaling factor $P_{scal}$. In one configuration, the determination whether to increment the preamble transmission counter is further based on a difference between the power ramping stepsize $P_{ramp-up}$ and the power scaling factor $P_{scal}$. In one configuration, the UE determines whether to increment the preamble transmission counter by determining to refrain from incrementing the preamble transmission counter when the difference between the power ramping stepsize $P_{ramp-up}$ and the power scaling factor $P_{scal}$ is less than a threshold $P_{count}$ or the PRACH transmission is determined not to be sent. In one configuration, the UE determines whether to increment the preamble transmission counter by determining to increment the preamble transmission counter when the difference between the power ramping stepsize $P_{ramp-up}$ and the power scaling factor $P_{scal}$ is greater than or equal to a threshold $P_{count}$ determined and the PRACH transmission is determined to be sent.

Figure 13:
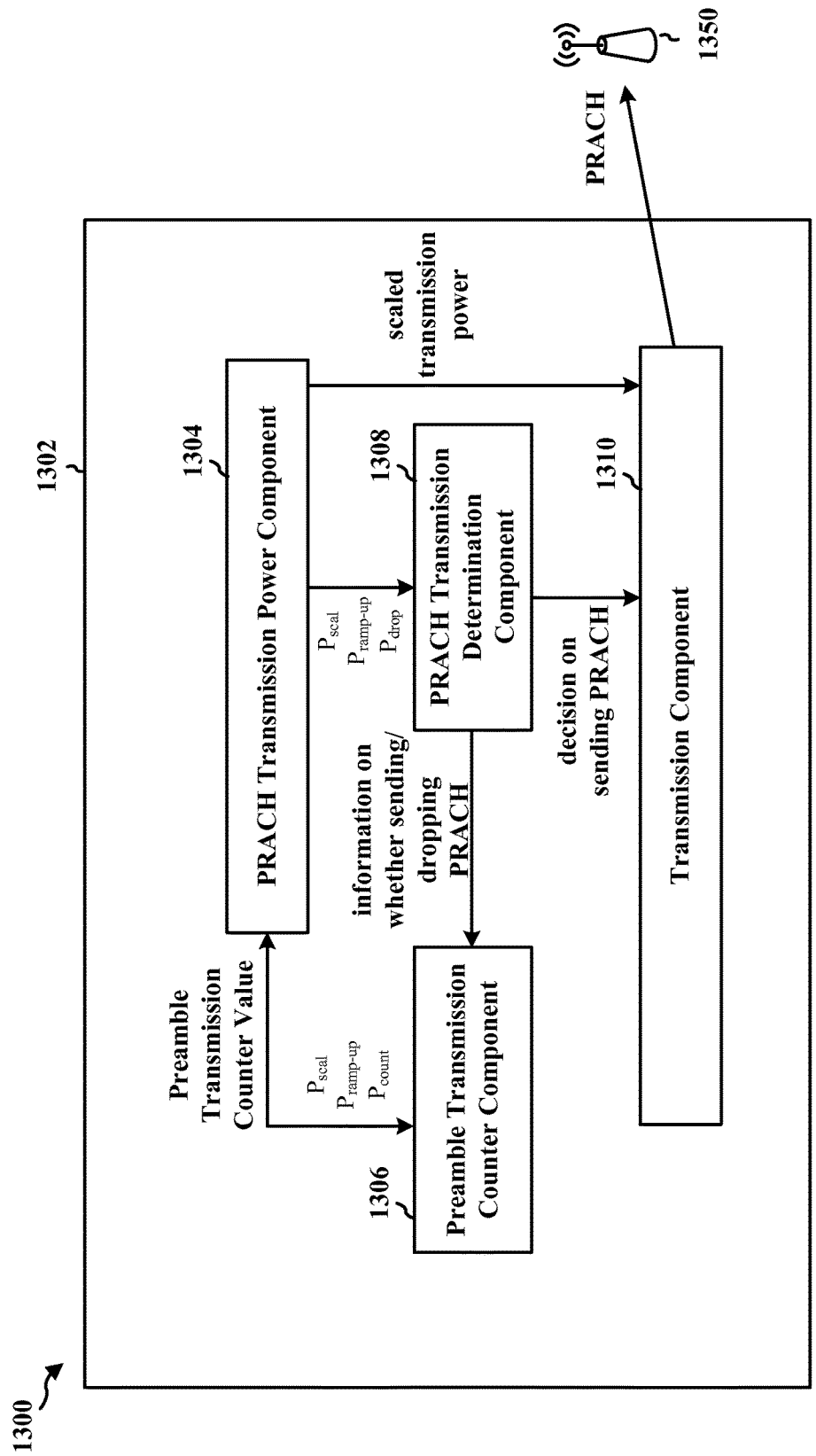
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE, such as the UE 902. The apparatus includes a PRACH transmission power component 1304 that is configured to determine to scale a transmission power for a PRACH transmission of a plurality of concurrent PRACH transmissions. The apparatus further includes a PRACH transmission determination component 1308 that is configured to determine whether to send the PRACH transmission based on the scaled transmission power. The apparatus further includes a transmission component 1310 that is configured to send the PRACH transmission at the scaled transmission power upon determining to send the PRACH transmission.

The apparatus may further include a preamble transmission counter component 1306 that is configured to determine whether to increment a preamble transmission counter based at least on the determination of whether to send the PRACH transmission by the PRACH transmission determination component 1308. The preamble transmission counter component 1306 may be configured to increment a preamble transmission counter upon the PRACH transmission determination component 1308 determining to send the PRACH transmission, and to refrain from incrementing the preamble transmission counter upon the PRACH transmission determination component 1308 determining not to send the PRACH transmission. The preamble transmission counter component 1306 may be configured to determine whether to increment a preamble transmission counter based on the power ramping stepsize $P_{ramp-up}$ and the power scaling factor $P_{scal}$. The power ramping stepsize $P_{ramp-up}$ and the power scaling factor $P_{scal}$ may be configured by the eNB 1350 via a cell-specific configuration (e.g., system information block (SIB) 1) and/or UE-specific configuration (e.g., RRC signaling). The preamble transmission counter component 1306 may receive values of the power ramping stepsize $P_{ramp-up}$ and the power scaling factor $P_{scal}$ from the PRACH transmission power component 1304 or another component. The preamble transmission counter component 1306 may be configured to determine whether to increment the preamble transmission counter based on a difference between the power ramping stepsize $P_{ramp-up}$ and the power scaling factor $P_{scal}$. When determining whether to increment the preamble transmission counter, the preamble transmission counter component 1306 may be configured to determine to increment the preamble transmission counter when the PRACH transmission is determined to be sent (based on information received from the PRACH transmission determination component 1308) and the difference between the power ramping stepsize $P_{ramp-up}$ and the power scaling factor $P_{scal}$ is greater than or equal to a threshold $P_{count}$. The preamble transmission counter component 1306 may receive a value of the threshold $P_{count}$ from the PRACH transmission power component 1304 or another component. When determining whether to increment the preamble transmission counter, the preamble transmission counter component 1306 may be configured to determine to refrain from incrementing the preamble transmission counter upon determining not to send the PRACH transmission or when the difference between the power ramping stepsize $P_{ramp-up}$ and the power scaling factor $P_{scal}$ is less than a threshold $P_{count}$.

The PRACH transmission power component 1304 may be configured to determine to scale the transmission power for the PRACH transmission based on a power scaling factor $P_{scal}$. The transmission power for the PRACH transmission may be based on a power ramping stepsize $P_{ramp-up}$ and the power scaling factor $P_{scal}$. The PRACH transmission determination component 1308 may be configured to determine whether to send the PRACH transmission based on the power ramping stepsize $P_{ramp-up}$ and the power scaling factor $P_{scal}$, both values of which may be received from the PRACH transmission power component 1304 or another component. As discussed supra, the power ramping stepsize $P_{ramp-up}$ and the power scaling factor $P_{scal}$ may be configured by the eNB 1350 via a cell-specific configuration (e.g., SIB 1) and/or UE-specific configuration (e.g., RRC signaling). The PRACH transmission determination component 1308 may be configured to determine whether to send the PRACH transmission based on a difference between the power ramping stepsize $P_{ramp-up}$ and the power scaling factor $P_{scal}$. In one configuration, the PRACH transmission determination component 1308 is configured to determine whether to send the PRACH transmission based on whether the difference between the power ramping stepsize $P_{ramp-up}$ and the power scaling factor $P_{scal}$ is greater than or equal to a threshold $P_{drop}$. The PRACH transmission determination component 1308 may receive the value for the threshold $P_{drop}$ from the PRACH transmission power component 1304 or another component. In one configuration, when determining whether to send the PRACH transmission, the PRACH transmission determination component 1308 is configured to determine to send the PRACH transmission when the difference between the power ramping stepsize $P_{ramp-up}$ and the power scaling factor $P_{scal}$ is greater than or equal to the threshold $P_{drop}$. In one configuration, when determining whether to send the PRACH transmission, the PRACH transmission determination component 1308 is configured to refrain from sending the PRACH transmission when the difference between the power ramping stepsize $P_{ramp-up}$ and the power scaling factor $P_{scal}$ is less than the threshold $P_{drop}$. When determining to send the PRACH transmission, the PRACH transmission determination component 1308 is configured to inform the transmission component 1310 of the decision to send the PRACH transmission. The transmission component 1310 is configured to receive information from the PRACH transmission power component 1304 indicating the scaled transmission power at which to send the PRACH transmission. In one configuration, the PRACH transmission power component 1304 is configured to determine a transmission power for another PRACH transmission based at least on the power ramping stepsize $P_{ramp-up}$ and a transmission power of a previously unsuccessful PRACH transmission. In addition, the transmission component 1310 is configured to send the another PRACH transmission at the determined transmission power for the another PRACH transmission. In one configuration, the transmission power of the previously unsuccessful PRACH transmission is a highest transmission power of previously sent unsuccessful PRACH transmissions. In one configuration, the transmission power of the previously unsuccessful PRACH transmission is a transmission power of an immediately previous sent unsuccessful PRACH transmission.

In one configuration, the PRACH transmission power component 1304 is configured to determine a transmission power for a PRACH transmission based at least on a power ramping stepsize $P_{ramp-up}$ and a previously determined transmission power of a previously sent unsuccessful PRACH transmission. In addition, the transmission component 1310 is configured to send the PRACH transmission at the determined transmission power. In one configuration, the transmission power of the previously sent unsuccessful PRACH transmission is a highest transmission power of previously sent unsuccessful PRACH transmissions. In one configuration, the transmission power of the previously sent unsuccessful PRACH transmission is a transmission power of an immediately previous sent unsuccessful PRACH transmission.

The apparatus may include additional components that perform each of the blocks of the algorithm in the aforementioned flowcharts of FIGS. 10-12. As such, each block in the aforementioned flowcharts of FIGS. 10-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
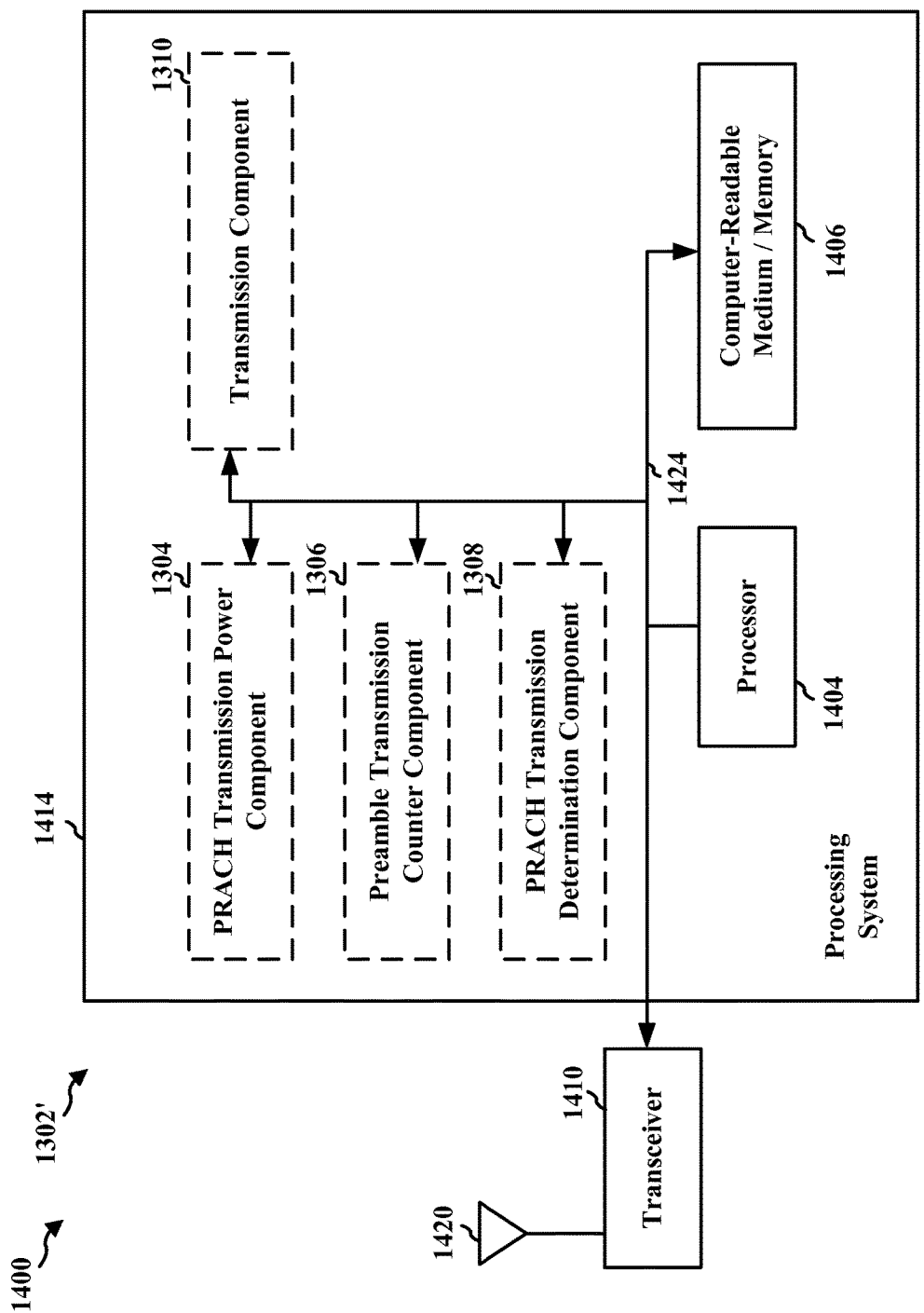
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means for determining to scale a transmission power for a PRACH transmission of a plurality of concurrent PRACH transmissions. In addition, the apparatus includes means for determining whether to send the PRACH transmission based on the scaled transmission power. Further, the apparatus includes means for sending the PRACH transmission at the scaled transmission power upon determining to send the PRACH transmission. In one configuration, the apparatus may further include means for determining whether to increment a preamble transmission counter based at least on the determination of whether to send the PRACH transmission. In one configuration, the apparatus may further include means for incrementing a preamble transmission counter upon determining to send the PRACH transmission, and means for refraining from incrementing the preamble transmission counter upon determining not to send the PRACH transmission. In one configuration, the apparatus may further include means for determining whether to increment a preamble transmission counter based on the power ramping stepsize and the power scaling factor. In one configuration, the means for determining whether to increment the preamble transmission counter makes the determination based on a difference between the power ramping stepsize and the power scaling factor. In one configuration, the means for determining whether to increment the preamble transmission counter is configure to determine to increment the preamble transmission counter when the PRACH transmission is determined to be sent and the difference between the power ramping stepsize and the power scaling factor is greater than or equal to a threshold. In one configuration, the means for determining whether to increment the preamble transmission counter is configured to determine to refrain from incrementing the preamble transmission counter upon determining not to send the PRACH transmission or when the difference between the power ramping stepsize and the power scaling factor is less than a threshold. In one configuration, the means for determining to scale the transmission power for the PRACH transmission makes the determination based on a power scaling factor. In such a configuration, the transmission power for the PRACH transmission may be based on a power ramping stepsize and the power scaling factor. Further, in such a configuration, the means for determining whether to send the PRACH transmission makes the determination based on the power ramping stepsize and the power scaling factor. In one configuration, the means for determining whether to send the PRACH transmission makes the determination based on a difference between the power ramping stepsize and the power scaling factor. In one configuration, the means for determining whether to send the PRACH transmission makes the determination based on whether the difference between the power ramping stepsize and the power scaling factor is greater than or equal to a threshold. In one configuration, the means for determining whether to send the PRACH transmission is configured to determine to send the PRACH transmission when the difference between the power ramping stepsize and the power scaling factor is greater than or equal to the threshold. In one configuration, the means for determining whether to send the PRACH transmission is configured to refraining from sending the PRACH transmission when the difference between the power ramping stepsize and the power scaling factor is less than the threshold. In one configuration, the apparatus further includes means for determining a transmission power for another PRACH transmission based at least on the power ramping stepsize and a transmission power of a previously unsuccessful PRACH transmission, and means for sending the another PRACH transmission at the determined transmission power for the another PRACH transmission. In one configuration, the transmission power of the previously unsuccessful PRACH transmission is a highest transmission power of previously sent unsuccessful PRACH transmissions. In one configuration, the transmission power of the previously unsuccessful PRACH transmission is a transmission power of an immediately previous sent unsuccessful PRACH transmission.

In one configuration, the apparatus 1302/1302' for wireless communication includes means for determining a transmission power for a PRACH transmission based at least on a power ramping stepsize and a previously determined transmission power of a previously sent unsuccessful PRACH transmission, and means for sending the PRACH transmission at the determined transmission power. In one configuration, the transmission power of the previously sent unsuccessful PRACH transmission is a highest transmission power of previously sent unsuccessful PRACH transmissions. In one configuration, the transmission power of the previously sent unsuccessful PRACH transmission is a transmission power of an immediately previous sent unsuccessful PRACH transmission. The apparatus may include further means as discussed supra.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   determining to scale a transmission power for a physical random access channel (PRACH) transmission of a plurality of concurrent PRACH transmissions;
   determining whether to send the PRACH transmission based on the scaled transmission power;
   sending the PRACH transmission at the scaled transmission power upon determining to send the PRACH transmission; and
   determining whether to increment a preamble transmission counter based at least in part on a power ramping stepsize.

2. The method of claim 1, further comprising determining whether to increment a preamble transmission counter based at least on the determination of whether to send the PRACH transmission.

3. The method of claim 1, further comprising:
   incrementing a preamble transmission counter upon determining to send the PRACH transmission; and
   refraining from incrementing the preamble transmission counter upon determining not to send the PRACH transmission.

4. The method of claim 1, wherein the determining whether to increment the preamble transmission counter is based on a difference between the power ramping stepsize and a power scaling factor.

5. The method of claim 4, wherein the determining whether to increment the preamble transmission counter comprises determining to increment the preamble transmission counter when the PRACH transmission is determined to be sent and the difference between the power ramping stepsize and the power scaling factor is greater than or equal to a threshold.

6. The method of claim 4, wherein the determining whether to increment the preamble transmission counter comprises determining to refrain from incrementing the preamble transmission counter upon determining not to send the PRACH transmission or when the difference between the power ramping stepsize and the power scaling factor is less than a threshold.

7. The method of claim 1, wherein:
   the determining to scale the transmission power for the PRACH transmission is based on the power scaling factor, the transmission power for the PRACH transmission is based on the power ramping stepsize and a power scaling factor, and the determining whether to send the PRACH transmission is based on the power ramping stepsize and the power scaling factor.

8. The method of claim 7, wherein the determining whether to send the PRACH transmission is based on a difference between the power ramping stepsize and the power scaling factor.

9. The method of claim 8, wherein the determining whether to send the PRACH transmission is based on whether the difference between the power ramping stepsize and the power scaling factor is greater than or equal to a threshold.

10. The method of claim 9, wherein the determining whether to send the PRACH transmission comprises determining to send the PRACH transmission when the difference between the power ramping stepsize and the power scaling factor is greater than or equal to the threshold.

11. The method of claim 9, wherein the determining whether to send the PRACH transmission comprises refraining from sending the PRACH transmission when the difference between the power ramping stepsize and the power scaling factor is less than the threshold.

12. A method of wireless communication, further comprising:
determining a transmission power for a physical random access channel (PRACH) transmission based on at least in part on a power ramping stepsize of a previously sent unsuccessful PRACH transmission;
sending the PRACH transmission at the determined transmission power; and
determining whether to increment a preamble transmission counter based at least on the power ramping stepsize.

13. The method of claim 12, wherein the transmission power of the previously sent unsuccessful PRACH transmission is a highest transmission power of previously sent unsuccessful PRACH transmissions.

14. The method of claim 12, wherein the transmission power of the previously sent unsuccessful PRACH transmission is a transmission power of an immediately previous sent unsuccessful PRACH transmission.

15. An apparatus for wireless communication, comprising:
a memory; and
at least one processor coupled to the memory and configured to:
determine to scale a transmission power for a physical random access channel (PRACH) transmission of a plurality of concurrent PRACH transmissions;
determine whether to send the PRACH transmission based on the scaled transmission power;
send the PRACH transmission at the scaled transmission power upon determining to send the PRACH transmission; and
determine whether to increment a preamble transmission counter based at least in part on a power ramping stepsize.

16. The apparatus of claim 15, wherein the at least one processor is further configured to determine whether to increment a preamble transmission counter based at least on the determination of whether to send the PRACH transmission.

17. The apparatus of claim 15, wherein the at least one processor is further configured to:

increment a preamble transmission counter upon determining to send the PRACH transmission; and
refrain from incrementing the preamble transmission counter upon determining not to send the PRACH transmission.

18. The apparatus of claim 15, wherein the at least one processor is configured to determine whether to increment the preamble transmission counter based on a difference between the power ramping stepsize and a power scaling factor.

19. The apparatus of claim 18, wherein the at least one processor is configured to determine whether to increment the preamble transmission counter by determining to increment the preamble transmission counter when the PRACH transmission is determined to be sent and the difference between the power ramping stepsize and the power scaling factor is greater than or equal to a threshold.

20. The apparatus of claim 18, wherein the at least one processor is configured to determine whether to increment the preamble transmission counter by determining to refrain from incrementing the preamble transmission counter upon determining not to send the PRACH transmission or when the difference between the power ramping stepsize and the power scaling factor is less than a threshold.

21. The apparatus of claim 15, wherein the at least one processor is configured to determine to scale the transmission power for the PRACH transmission based on a power scaling factor, the transmission power for the PRACH transmission being based on the power ramping stepsize and the power scaling factor, and wherein the at least one processor is configured to determine whether to send the PRACH transmission based on the power ramping stepsize and the power scaling factor.

22. The apparatus of claim 15, wherein the at least one processor is configured to:
determine a transmission power for another PRACH transmission based at least on the power ramping stepsize and a transmission power of a previously unsuccessful PRACH transmission; and
send said another PRACH transmission at the determined transmission power for said another PRACH transmission.

23. An apparatus for wireless communication, comprising:
a memory; and
at least one processor coupled to the memory and configured to:
determine a transmission power for a physical random access channel (PRACH) transmission based on one or more of a power ramping stepsize, a power scaling factor, or a previously determined transmission power of a previously sent unsuccessful PRACH transmission;
send the PRACH transmission at the determined transmission power; and
determine whether to increment a preamble transmission counter based at least on a power ramping stepsize.

24. The apparatus of claim 23, wherein the transmission power of the previously sent unsuccessful PRACH transmission is a highest transmission power of previously sent unsuccessful PRACH transmissions.

25. The apparatus of claim 23, wherein the transmission power of the previously sent unsuccessful PRACH transmission is a transmission power of an immediately previous sent unsuccessful PRACH transmission.

* * * * *